(12) United States Patent
Malay et al.

(10) Patent No.: US 6,468,691 B1
(45) Date of Patent: Oct. 22, 2002

(54) ELECTROCHEMICAL CELL WITH IMPROVED GASKET AND SEAL

(75) Inventors: Manuel Rafols Malay, Brunswick; Robert E. Ray, Jr., Strongsville, both of OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/514,925

(22) Filed: Feb. 28, 2000

Related U.S. Application Data (60) Provisional application No. 60/122,031, filed on Mar. 1, 1999.

(51) Int. Cl.[7] .............................................. H01M 2/08
(52) U.S. Cl. ..................... 429/174; 429/163; 429/164; 429/168; 429/171
(58) Field of Search ................................ 429/163, 164, 429/168, 171, 174

(56) References Cited

U.S. PATENT DOCUMENTS

| | | | |
|---|---|---|---|
| 3,723,184 A | 3/1973 | Stark et al. | 136/133 |
| 3,904,438 A | 9/1975 | Naylor et al. | 136/133 |
| 4,258,108 A | 3/1981 | Glaser | 429/162 |
| 4,557,983 A | 12/1985 | Sauer | 429/27 |
| 4,656,104 A | 4/1987 | Tucholski | 429/185 |
| 4,791,034 A | 12/1988 | Dopp | 429/27 |
| 5,567,538 A | 10/1996 | Oltman et al. | 429/27 |
| 5,725,967 A | * 3/1998 | Tuttle | 429/185 |

FOREIGN PATENT DOCUMENTS

| | | | |
|---|---|---|---|
| FR | 2406899 | 6/1979 | |
| JP | 258847 | 12/1985 | |
| JP | 8124545 | 5/1996 | |
| JP | 050276 | 2/1998 | |
| JP | 283588 | 10/1999 | |
| JP | 11283588 | * 10/1999 | H01M/2/08 |

* cited by examiner

Primary Examiner—Carol Chaney
Assistant Examiner—Dah-Wei D. Yuan
(74) Attorney, Agent, or Firm—Russell H. Toye, Jr.; Robert W. Welsh (57) ABSTRACT

Disclosed is an electrochemical cell using a gasket with projections on both surfaces of an upstanding wall. When used as a seal member between two parts of the housing of an electrochemical cell, a plurality of high compressive stress areas is formed in the gasket wall. When projections on opposite sides of the gasket are not horizontally aligned, an effective seal can be achieved with a thinner-wall gasket, providing more internal cell volume for active materials. Also disclosed is a process for assembling the cell.

23 Claims, 10 Drawing Sheets

(5 of 10 Drawing Sheet(s) Filed in Color)

| Stress -psi | | |
|---|---|---|
| | 500 | Tensile |
| | 1000 | Compressive |
| | 2500 | Compressive |
| | 5000 | Compressive |

Fig. 10A

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 10B

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 10C

LEGEND Compressive Elastic Strain
Light gray: < 0 (plastic)
Yellow: 0 to 0.999%
Red: 1.000 to 1.999%
Blue: 2.000 to 2.999%
Dark gray: ≥ 3.000%

Fig. 10D

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 11A

LEGEND Compressive Stress (psi)
 Light gray: < 0 (tensile)
 Yellow: 0 to 749
 Orange: 750 to 1499
 Red: 1500 to 2249
 Blue: 2250 to 2999
 Dark gray: ≥ 3000

Fig. 11B

LEGEND Compressive Stress (psi)
 Light gray: < 0 (tensile)
 Yellow: 0 to 749
 Orange: 750 to 1499
 Red: 1500 to 2249
 Blue: 2250 to 2999
 Dark gray: ≥ 3000

Fig. 11C

LEGEND Compressive Elastic Strain
 Light gray: < 0 (plastic)
 Yellow: 0 to 0.999%
 Red: 1.000 to 1.999%
 Orange: 1.500 to 2.249%
 Blue: 2.250 to 2.999%
 Dark gray: ≥ 3.000%

Fig. 11D

LEGEND Compressive Stress (psi)
 Light gray: < 0 (tensile)
 Yellow: 0 to 749
 Orange: 750 to 1499
 Red: 1500 to 2249
 Blue: 2250 to 2999
 Dark gray: ≥ 3000

Fig. 12A

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 12B

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 12C

LEGEND Compressive Elastic Strain
Light gray: < 0 (plastic)
Yellow: 0 to 0.999%
Red: 1.000 to 1.999%
Blue: 2.000 to 2.999%
Dark gray: ≥ 3.000%

Fig. 12D

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 14A

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 14B

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 14C

LEGEND Compressive Elastic Strain
Light gray: < 0 (plastic)
Yellow: 0 to 0.749%
Red: 0.750 to 1.499%
Orange: 1.500 to 2.249%
Blue: 2.250 to 2.999%
Dark gray: ≥ 3.000%

Fig. 14D

LEGEND Compressive Stress (psi)
Light gray: < 0 (tensile)
Yellow: 0 to 749
Orange: 750 to 1499
Red: 1500 to 2249
Blue: 2250 to 2999
Dark gray ≥ 3000

Fig. 15

ELECTROCHEMICAL CELL WITH IMPROVED GASKET AND SEAL

CROSS REFERENCE TO RELATED APPLICATIONS

This application claims the benefit of Provisional Application No. 60/122,031, filed Mar. 1, 1999.

FIELD OF THE INVENTION

The invention relates to an electrochemical cell with an improved insulating gasket resulting in an improved seal. The invention also relates to a process for producing the cell.

BACKGROUND OF THE INVENTION

The miniaturization of electronic devices has created a demand for small but powerful electrochemical cells. Cells that utilize an alkaline electrolyte are known to provide high energy density per unit volume and are, therefore, well suited for applications in miniature electronic devices such as hearing aids, cameras, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell's cup and can so as to provide a seal for the cell. Generally, the gasket must be made of a material inert to the electrolyte contained in the cell and to the cell environment. In addition, it must be flexible and resistant to cold flow under pressure of the seal, and it must maintain these characteristics so as to insure a proper seal during long periods of storage. Materials such as nylon, polypropylene, ethylene-tetrafluoroethylene copolymer and high density polyethylene have been found to be suitable as gasket materials for most applications. Typically, the insulating gasket is in the form of a "J" shaped configuration with a "U" shaped groove, into which the extended wall of the cup is inserted. When the cup and gasket are inserted into the can and the cell is radially squeezed, a flange of the gasket forms a seal with the bottom portion of the wall of the cup. The gasket generally extends the entire length of the peripheral wall of the cell and generally has a relative flat wall component having a uniform thickness. To better insure a good seal, a sealant is generally applied to the gasket, including its "U" shaped groove. Upon insertion of the cup into the gasket, the edge of the extended wall of the cup will seat in the sealant, and then, upon the application of a compressive force, the wall of the gasket will be compressed against the edge of the extended cup wall.

It is desirable to minimize the volume taken up by the gasket of an electrochemical cell in order to maximize the amount of the total internal volume of the cell that is available for active materials. This is particularly true in miniature cells, in which the volume of the gasket is a relatively large percentage of the total cell volume. However, the thinner the gasket wall, the smaller the range of compression of the gasket wall (in inches or millimeters) between the parts of the cell container to be sealed that will result in a good seal. The smaller acceptable dimensional range makes variation in dimensions of the cell parts and variation in the dimensions of the closed cell more critical and more difficult to control. This is further complicated by greater difficulty in molding thinner wall gaskets, leading to increased variation in wall thickness. In addition, it is more difficult to sufficiently compress the wall of thinner gaskets using moderate pressures, while the anode cup of a miniature cell may be deformed if larger forces are applied. As a result, with conventional gaskets there is a practical limit to how thin the gasket wall can be made without sacrificing the effectiveness of the seal.

Another problem that can occur with gaskets of a conventional design is the loss of adequate compressive stress if the adjacent walls of the can and cup spread apart. This may occur shortly after closing the cell and/or over time due to a tendency of the can wall to relax and return to its previous larger diameter. Because thinner gaskets will maintain adequate compressive stress for a good seal over a smaller range of compression (in inches or millimeters) of the gasket wall, the thinner gaskets are more prone to losing adequate compressive stress when the can and cup walls spread apart.

Cold flow, which is the tendency of a plastic to flow at temperatures below its melting point when a compressive force is applied, also contributes to the loss of compressive stress in gaskets over time. The rate of cold flow can increase considerably when cells are exposed to higher temperatures. Stiffer materials are generally more resistant to cold flow, but other sealing properties of these stiffer materials tend to be inferior.

In U.S. Pat. No. 4,656,104, Tucholski discloses a sealing gasket for an electrochemical cell that has a vertical peripheral wall that is tapered and/or stepped so that the average thickness is less at the top than at the bottom. Advantages of this type of gasket include a reduction in the vertical force required to crimp the sidewall of the container and a reduction in the volume of gasket material squeezed between the bent over portion of the container sidewall and the cell cover. Reducing the thickness of the upper portion of the gasket wall also reduces the internal cell volume taken up by the gasket, but not by as much as if the thickness of the entire peripheral wall of the gasket were reduced.

In U.S. Pat. No. 4,258,108, Glaser discloses a method of leak-proofing button cells by placing a hydroxide binding material on the side of the sealing region facing away from the electrolyte. The hydroxide binding material may be positioned on the outer side of the sealing region, or it may be positioned in grooves which encircle the plastic seal. The hydroxide binding material is intended to reduce the escape of electrolyte from the cell due to creepage of the KOH electrolyte. It does not, however, improve the sealing characteristics of the gasket itself, thereby allowing the use of a gasket with a thinner wall or the use of stiffer gasket materials that are more resistant to cold flow.

Stark et al., in U.S. Pat. No. 3,723,184, disclose a battery cell closure comprising a cell container having alternate upstanding projections and depressions along the inner sidewall of its mouth portion and a compressible insulating sealing ring interposed between the top closure of the cell and the cell container. The disclosed invention is intended to prevent longitudinal displacement of the sealing ring upon application of a radial force, such as that effected by crimping the cell, as a result of flowing of sealing ring material into to grooves. Stark et al. do not disclose how their invention might allow the use of a gasket with a thinner peripheral wall, and the required projections and depressions along the inside of the mouth portion of the cell container make manufacture of the container more difficult and expensive.

In U.S. Pat. No. 4,791,034, Dopp discloses the use of a sealing sleeve having inwardly protruding ridges to seal the interface of metal components of electrochemical cells and the like. An improved seal results; however, further improvement and/or reduction in the wall thickness is desirable.

It is an object of the present invention to provide an electrochemical cell with a sealing gasket, having a wall component in which both of its surfaces have at least one compressed projection, with improved sealing characteristics.

It is also an object of the present invention to provide an electrochemical cell with a thinner gasket wall, a larger internal volume available for active materials and an increased discharge capacity.

It is another object of the present invention to provide an electrochemical cell with a sealing gasket which is more resistant to cold flow than conventional gaskets.

It is yet another object of the present invention to provide an electrochemical cell with a sealing gasket that will maintain adequate compressive stress to provide an excellent seal when the distance between the sealing surfaces of the cell container increases.

It is another object of the present invention to provide an electrochemical cell with a sealing gasket that is inexpensive and easy to make and for which dimensional tolerances are less critical than conventional gaskets.

It is a further object of the present invention to provide a process for producing an electrochemical cell having the above advantages.

The foregoing and additional objects of the present invention will become more fully apparent from the following description and drawings.

SUMMARY OF THE INVENTION

One aspect of the invention relates to an electrochemical cell comprising:
(a) a first electrode;
(b) a second electrode;
(c) a separator between the first electrode and the second electrode;
(d) an electrolyte;
(e) a two-part conductive housing, the first part being a can with a peripheral wall having a first sealing surface and the second part being a cup with a peripheral wall having a second sealing surface, wherein the first and second surfaces are substantially smooth; and
(f) an insulating gasket comprising a peripheral wall having third and fourth sealing surfaces, wherein:
  (i) the peripheral gasket wall is disposed between the peripheral can and cup walls and forms compressive seals between the first surface of the can and the third surface of the gasket and between the second surface of the cup and the fourth surface of the gasket;
  (ii) each of the third and fourth surfaces has at least one compressed projection thereon and the at least one compressed projection on the third surface is offset from the at least one compressed projection on the fourth surface in a direction parallel to a longitudinal axis of the peripheral gasket wall; and
  (iii) an area of high compressive stress relative to the surrounding area is disposed at each compressed projection.

Another aspect of the invention is an electrochemical cell comprising a two-part conductive housing, the first part being a can with a peripheral wall having a first sealing surface and the second part being a cup with a peripheral wall having a second sealing surface, and an insulating gasket, the gasket comprising a peripheral wall having third and fourth sealing surfaces disposed and compressed between the peripheral can and cup walls; wherein, with the gasket in the normal uncompressed condition:
(a) each of the third and fourth surfaces has at least one projection thereon;
(b) each projection has a center of mass, a point of greatest protrusion relative to the longitudinal centerline and a point of least protrusion relative to the longitudinal centerline;
(c) the center of mass of each projection on the third surface is offset from the center of mass of each projection on the fourth surface in a direction parallel to the longitudinal centerline;
(d) each projection comprises a step having a flat segment, sloping from its point of highest protrusion to its point of lowest protrusion; and
(e) the flat segments of the projections on the third surface are parallel to the flat segments of the projections on the fourth sealing surface.

Yet another aspect of this invention is a process for assembling an electrochemical cell comprising the steps:
a) preparing a conductive can having a peripheral wall with a first sealing surface;
b) preparing a conductive cup having a peripheral wall with a second sealing surface;
c) preparing an electrically insulating gasket having a peripheral wall with third and fourth sealing surfaces, each having at least one projection thereon, wherein the at least one compressed projection on the third surface is offset from the at least one compressed projection on the fourth surface in a direction parallel to a longitudinal axis of the peripheral gasket wall;
d) placing electrode materials, separator and electrolyte within the cup and the can;
e) assembling the can and the cup together so that the sealing surfaces of the peripheral wall of the gasket are in contact with and disposed between the peripheral walls of the can and the cup; and
f) securing the can to the cup so as to compress the at least one projection on both the third and fourth surfaces of the peripheral wall of the gasket, creating an area of high compressive stress at each compressed projection, thereby effectively sealing the can to the cup via the gasket and electrically insulating the can from the cup.

BRIEF DESCRIPTION OF THE DRAWINGS

The file of this patent contains at least one drawing executed in color. Copies of this patent with color drawings are provided to the Patent and Trademark Office with payment of the necessary fee.

The present invention will become apparent from the following description thereof when considered together with the accompanying drawings which are set forth above as being exemplary of embodiments of the present invention and are not intended, in any way, to be limitative thereof and wherein.

DETAILED DESCRIPTION OF THE INVENTION

The present invention may be used with electrochemical cells of any suitable electrochemistry, as long as the materials of the cell container and gasket are stable when in contact with the internal components of the cell.

The present invention is particularly well suited to cylindrical cell and miniature button cell designs, such as those commonly used in consumer alkaline cells (e.g., primary zinc-manganese dioxide and rechargeable nickel-cadmium cells) and consumer nonaqueous cells (e.g., primary lithium-manganese dioxide and rechargeable lithium ion cells). However, the present invention may also be adapted to cells having other cross sectional shapes, such as prismatic cells.

The present invention is not limited to any particular electrode design. For example, the electrodes may be in the form of bobbins, pellets, discs, belts, gels, liquids and the like.

The electrochemical cell of the present invention is one with a two-part conductive housing. One part is generally referred to as a can or container, and the other part is generally referred to as a cup, cover, lid or closure. As used herein, the term can shall include container and the term cup shall include cover, lid and closure. Other structures performing essentially the same functions as a can or a cup may be used. Any conductive materials recognized as suitable by one skilled in the art may be used for the cup or the can. The cup and the can may, but need not, be made of the same materials. Steel is commonly used for cans and cups. The steel may be plated or coated on the inside and/or outside surface to provide protection against internal cell components or the external environment, to provide improved electrical conductivity, or to produce an attractive appearance. Other materials, such as aluminum, may also be used for either the can or the cup. The can and cup materials and/or designs must provide sufficient strength in the peripheral walls to maintain a good compressive seal with the gasket over a long period of time in environments in which the cell will be stored and used. The can and the cup may be formed by any suitable method. Portions of the peripheral walls of both the can and the cup are used as sealing surfaces. These sealing surfaces are essentially smooth (i.e., without substantial depressions, such as grooves, or substantial projections, such as ridges) other than imperfections, due to the nature of the material and/or caused by the manufacturing process, or textured micro-finishes. Preferably the sealing surfaces of the can and cup have minimal scratches, nicks and other imperfections that could result in paths for liquid to leak from the cell or for gases in the surrounding air to enter the cell. A sealant may be applied to sealing surfaces of any of the gasket, can and cup to fill such imperfections and improve resistance to both leakage and air ingress. Preferably no depression or groove in the sealing surfaces of the can and cup exceeds a depth or height, respectively, equal to 10% (more preferably 5%) of the nominal thickness of the peripheral wall of the gasket.

The electrochemical cell of the present invention has a gasket with a peripheral wall disposed and compressed between the peripheral walls of the can and the cup to provide a compressive seal for the cell. The gasket material must be selected with consideration given to its stability in the presence of the electrolyte, its resiliency, and its resistance to cold flow. Suitable polymeric materials include nylon, polytetrafluoroethylene, fluorinated ethylene-propylene, chlorotrifluoroethylene, perfluoroalkoxy polymer, polyvinyls, polyethylene, polypropylene, polystyrene, polysulfone and the like. Other suitable materials would be recognizable by one skilled in the art. The gasket material may also contain particulate material, such as glass or minerals (e.g., talc) as fillers to improve the gasket's resistance to cold flow or otherwise modify the sealing properties of the gasket. Use of the present invention expands the range of materials with greater resistance to cold flow that may be used without sacrificing other important seal characteristics. In some applications, additional precautions can be used in conjunction with the gasket of the invention to provide a more effective seal, such as coating selected areas of the gasket with a sealing agent such as a fatty polyamide resin or asphalt.

The gasket used in the present invention is one which, prior to assembly into the cell, has at least one projection on both surfaces of the peripheral wall. As used herein, a projection can be any substantial peak, ridge, crest, crown or other type of protrusion from a surface (i.e., not including imperfections, defects or texturing of the surface). The projections on the gasket should preferably extend continuously around the entire peripheral wall of the gasket but may also be arranged as a series of projections. Preferably, the height of the projections is equal to at least 5%, more preferably at least 10%, of the nominal thickness of the peripheral wall of the gasket. As used herein, the nominal thickness of the peripheral wall of the gasket means the average thickness, not including protrusions, from one sealing surface to the opposite sealing surface, measured perpendicular to the longitudinal axis of the peripheral wall of the gasket. If such measurements cannot be made to exclude protrusions (e.g., the gaskets shown in FIGS. 8, 14 and 15), the measurements will be made at points where the thickness is at a minimum.

Preferably, for miniature electrochemical cells, the nominal thickness of the gasket can be less than about 0.010 inch (0.25 millimeter), preferably less than about 0.007 inch (0.18 millimeter), more preferably less than about 0.005 inch (0.13 millimeter), and most preferably less than about 0.004 inch (0.10 millimeter).

When the electrochemical cell of the present invention is sealed, the at least one projection on both surfaces of the peripheral wall of the gasket are compressed against the adjacent sealing surfaces of the can and cup to form a compressed projection. As used herein, a compressed projection is a projection that is at least partially compressed to produce compressive stress in the gasket material at the projection; it may be fully compressed to a degree that it no longer protrudes from the surface of the gasket. As a result of the compressed projections, the electrochemical cell of the invention will have multiple high compressive stress areas between the cup and the can of this cell. In general, the larger the bands of high compressive stress the better. Preferably each band is wide enough that it is not completely spanned by defects in the sealing surfaces of the gasket, can or cup. The multiple high compressive stress areas will provide multiple sealing bands that will more effectively seal the cell or, alternatively, will seal the cell as effectively as conventional cells while using a thinner gasket. A thinner gasket compared to a conventional size gasket will provide more internal volume in the cell for additional active materials. The multiple high compressive stress areas of the gasket of a sealed electrochemical cell provide an excellent seal for the cell that can: a) compensate for uneven surfaces of the can and cup walls, b) provide multiple sealing bands in the gasket wall, c) compensate for increased variability in gasket wall thickness with thinner gasket walls, and d) better tolerate spring-back of the can wall after closing the cell. Small pockets may also be present between high stress areas. Small amounts of electrolyte entering the interface between the gasket and the can or cup can be accommodated in these pockets.

Preferably the gasket can provide both radial and axial seals. The radial seal is the result of can outside diameter reduction, which squeezes the gasket between the cup and the can walls. The can diameter reduction can be achieved using any suitable method, such as swaging, colleting or crimping. The axial load on the other hand can be obtained by any suitable method, such as crimping. To effectively provide a working seal, the gasket has to fit between the adjacent sealing surfaces of the components to be sealed. The gasket should be able to conform to the sealing surfaces of those components without deforming them. The gasket of the subject invention can provide an effective seal in the axial and/or radial direction.

Computer modeling can be used to evaluate seal designs. Finite element analysis is a type of model which is particularly useful for evaluating compression seals in electrochemical cells. Examples of suitable computer software programs that can be used for finite element analysis are ABAQUS, available from Hibbit, Karlsson & Sorensen, Inc., Pawtucket, R.I., USA, and MARC K7.3, available from MSC.Software, Los Angeles, Calif., USA. For a cell to have a good compression seal, it is preferable to have at least a minimum amount of compression of the gasket, at the interfaces between the sealing surfaces of the gasket and the adjacent sealing surfaces of the cell container, around the entire perimeter of the sealed opening. The amount of compression can be expressed as compressive stress, which can be calculated using finite element analysis. For miniature alkaline cells it has been found that a compressive stress of at least 1,500 pounds per square inch (105 kg/cm$^2$) will provide a good seal; however, at least 2,000 pounds per square inch (140 kg/cm$^2$) is preferred, and at least 3,000 pounds per square inch (210 kg/cm$^2$) is still more preferred. For some electrochemical systems, such lithium and lithium ion systems with nonaqueous electrolytes, even higher compressive stress levels are preferred. Compressive stress can be calculated under a variety of simulated conditions before, during and after sealing the cell, to include storage of the cell at different temperatures for various durations. The desired minimum compressive stress should be maintained under the conditions the cell will be exposed to over its entire useful life. Finite element analysis can also be used to determine elastic strain, which is an indication of the ability of a body to return to its original shape. The greater the compressive elastic strain in a body, the greater its ability to maintain compressive stress as the compressive forces on the body are reduced (e.g., due to spring-back of the can and or cup after cell closing, cold flow of the gasket material, and exposure to heat/cold).

Features and advantages of the invention are exemplified below and in the drawings. A miniature zinc-air cell is used for this purpose, but the principles are applicable to other cell systems, sizes and designs.

Figure 1:
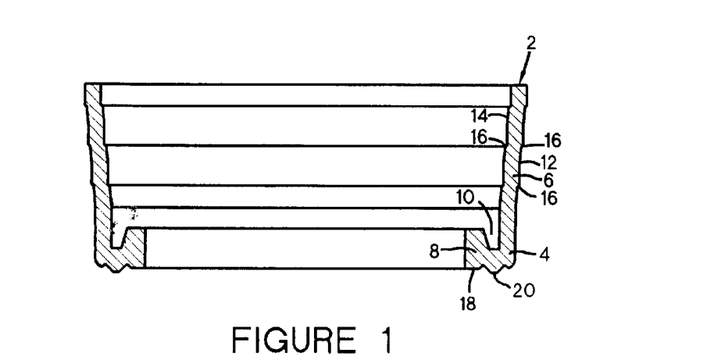
FIG. 1 is a cross-sectional view of a novel gasket for use in an air depolarized cell.

FIG. 1 shows a circular insulating gasket 2 comprising a base member 4 having a peripheral wall 6 and an inner wall 8 spaced apart from the peripheral wall 6 thereof defining a "U" shaped groove 10. The outer surface 12 and the inner surface 14 have a plurality of projections 16 and the bottom surface 18 of base member 4 hag a projection 20.

Figure 2:
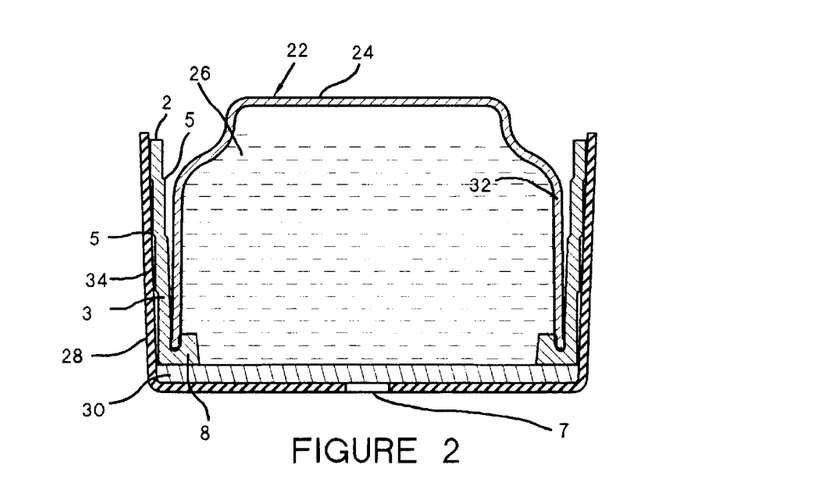
FIG. 2 is a cross-sectional view of the gasket of FIG. 1 placed between a wall of an anode-cup and a cathode-can of an air depolarized cell.

FIG. 2 shows a cell 22 comprising a cup 24 containing an anode 26, and a can 28 containing an air electrode 30. The air electrode 30, although not shown in detail, generally comprises a separator, a nickel screen, the electrode material, a polytetrafluorethylene (PTFE) layer and an air distribution membrane. The gasket 3 is shown disposed between wall 32 of cup 24 and wall 34 of can 28. The gasket 3 has a plurality of projections 5. A hole 7 is located in the bottom of can 28 to act as an air-entering port. A piece of tape can be used to seal opening 7 prior to use of the cell. The positive electrode 30 (air electrode), can comprise manganese dioxide, activated carbon, and acetylene black, with further addition of polytetrafluorethylene (PTFE) dispersion, to provide a mix that can be applied on a metallic screen. A layer of polytetrafluoroethylene film generally covers the entire base of the can including an air distribution membrane. The negative electrode (anode) comprising zinc powder is placed in the cup and makes electronic contact with the cup. The negative electrode can comprise a mixture of zinc particles, electrolyte and organic compounds such as binders which make up the battery's negative electrode. Preferably, the electrode comprises zinc powder and an aqueous potassium hydroxide solution, for instance a 30% potassium hydroxide solution. The cup can be made from a trilaminate material comprising copper that has been laminated to the bare side of a nickel-clad steel strip. A nickel layer could be used to protect the exterior surface of the steel strip. Other laminated materials from which the cup may be made include: a bilaminate of copper on a stainless steel substrate or a laminate made from more than three layers. Round disks punched from this laminated metal strip can then be formed into a cup. The copper layer forms the inside surface of the cup and directly contacts the negative electrode mixture.

Figure 3:
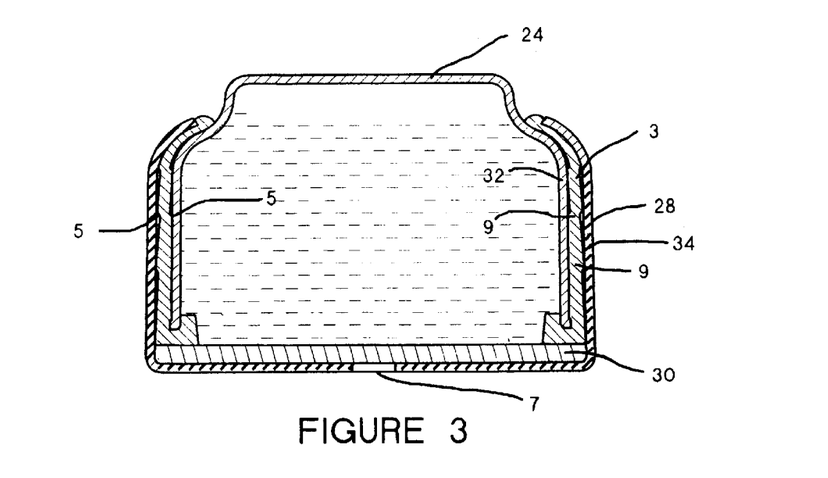
FIG. 3 is a cross-sectional view of an air depolarized cell of FIG. 2 after the gasket is compressed between the wall of the anode-cup and the wall of the cathode-can providing a sealed air depolarized cell.

FIG. 3 shows the cell of FIG. 2 after the gasket 3 is compressed between wall 32 of cup 24 and wall 34 of can 28. The gasket 3 can be compressed using any known technique such as swaging, collating or crimping. The projections 5 are compressed between the wall 32 of cup 24 and the wall 34 of can 28 producing multiple high compressive stress areas 9. These multiple high compress stress areas 9 provide multiple seal areas between the wall of the cup and the wall of the can thereby providing a plurality of effective seal bands to eliminate or minimize electrolyte leaking from the cell.

Figure 4:
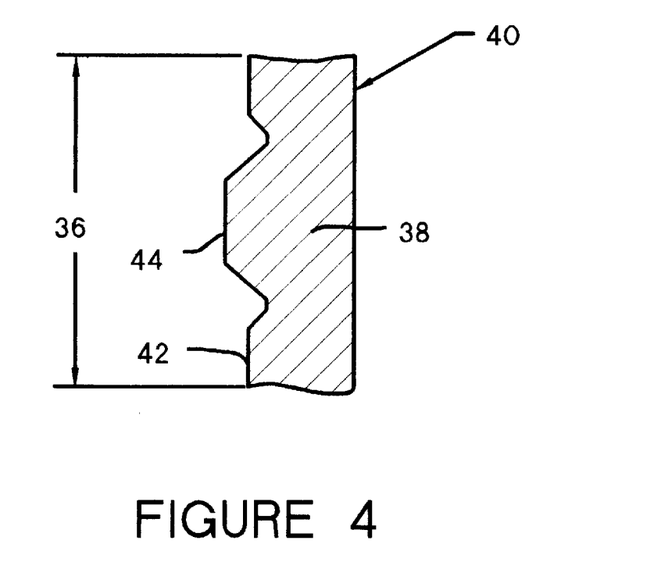
FIG. 4 is a cross-sectional view of a segment of the peripheral wall of a conventional gasket without a compressive stress load.

FIG. 4 shows a segment 36 of wall 38 of a gasket 40 without any applied load or compressive stress. The surface 42 is shown with a projection 44 defined as an area protruding above surface 42.

Figure 5:
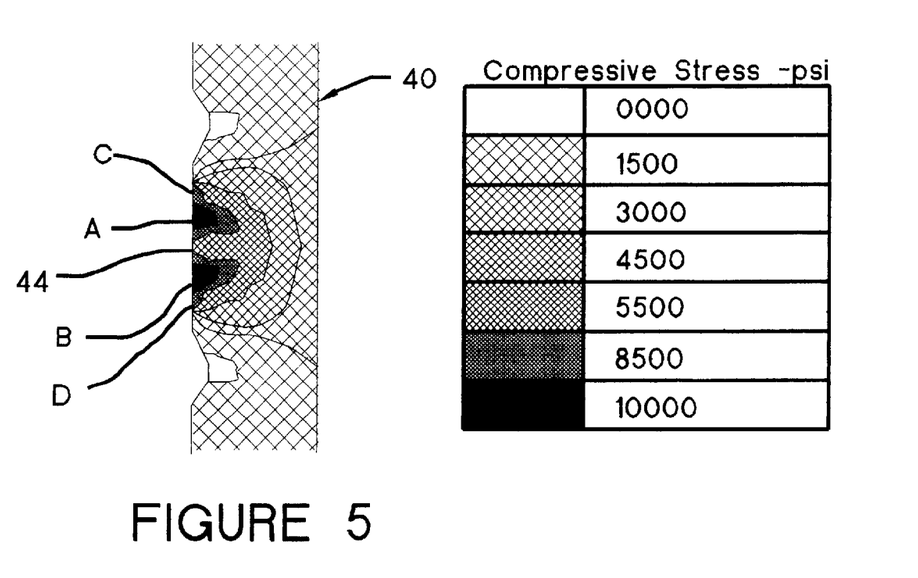
FIG. 5 is a cross sectional view of the gasket segment of FIG. 4 with a compressive load.

FIG. 5 shows the gasket 40 of FIG. 4 with a compressive load, which produces different compressive stress regions along the segment of the gasket 40. At the area of the compressed projection 44, a compressive stress of 10,000 psi (703 kg/cm$^2$) is shown at areas A and B with a compressive stress at areas C and D of 8,500 psi (598 kg/cm$^2$) surrounding areas A and B, respectively. As shown in FIG. 5, effective seal bands are provided at the high compressive stress areas. With the gasket 40 made with a plurality of projections, the gasket would be provided with a plurality of seal bands to effectively eliminate liquid leakage after the cell is sealed. The multiple band seal design of the gasket of this invention provides a more effective seal than the seal of a conventional gasket.

Figure 6:
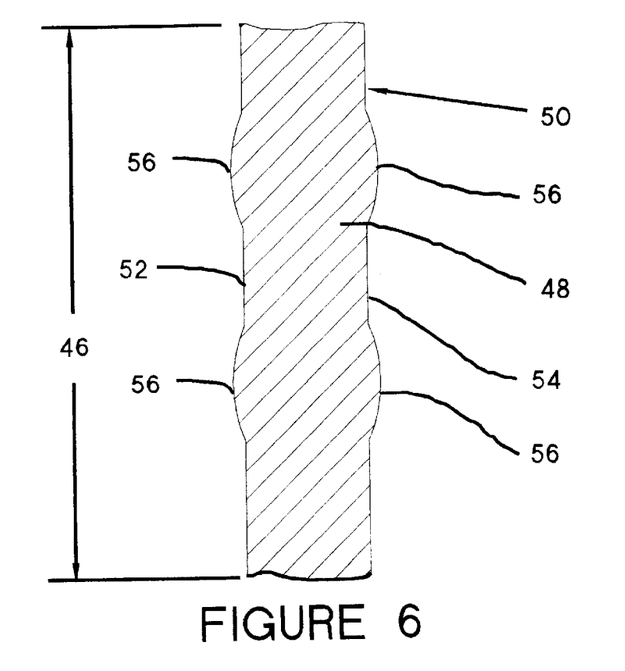
FIG. 6 is a cross-sectional view of a segment of the peripheral wall of another conventional gasket without a compressive stress load.

FIG. 6 shows a segment 46 of a wall 48 of a gasket 50 without any applied load or compressive stress. Both surfaces 52 and 54 of the gasket 50 are shown with projections 56, defined as areas protruding above surfaces 52 and 54. The projections 56 are horizontally aligned on both surfaces 52 and 54. As used herein, horizontally aligned means centered about a single imaginary line perpendicular to a longitudinal axis of the gasket wall.

Figure 7:
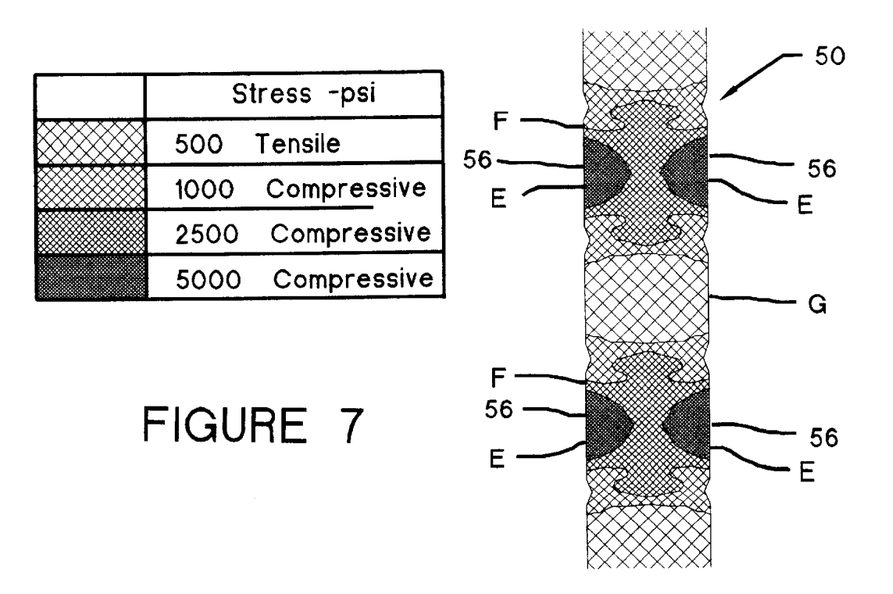
FIG. 7 is a cross sectional view of the gasket segment of FIG. 6 with a compressive load.

FIG. 7 shows gasket 50 of FIG. 6 with compressive stress areas and tensile stress areas along the segment 46 (FIG. 6) of gasket 50. At the central area of the compressed projections 56, compressive stresses of 5,000 psi (352 kg/cm$^2$) are shown at areas E surrounded by areas F having compressive stresses of 2,500 psi (176 kg/cm$^2$). Disposed between areas E are areas G which have tensile stresses of 500 psi (35 kg/cm$^2$). As shown in FIG. 7, effective seal bands are provided at high compressive stress areas of gasket 50. As evident from FIG. 7, the multiple band seal design of this novel gasket provides a more effective seal than the seal of a conventional gasket. The gasket 50 can be made with a thinner cross-sectional area so that the internal volume for the conventional type housing for a fixed size cell can be increased to accommodate more active materials for the cell.

Figures 8, 9:
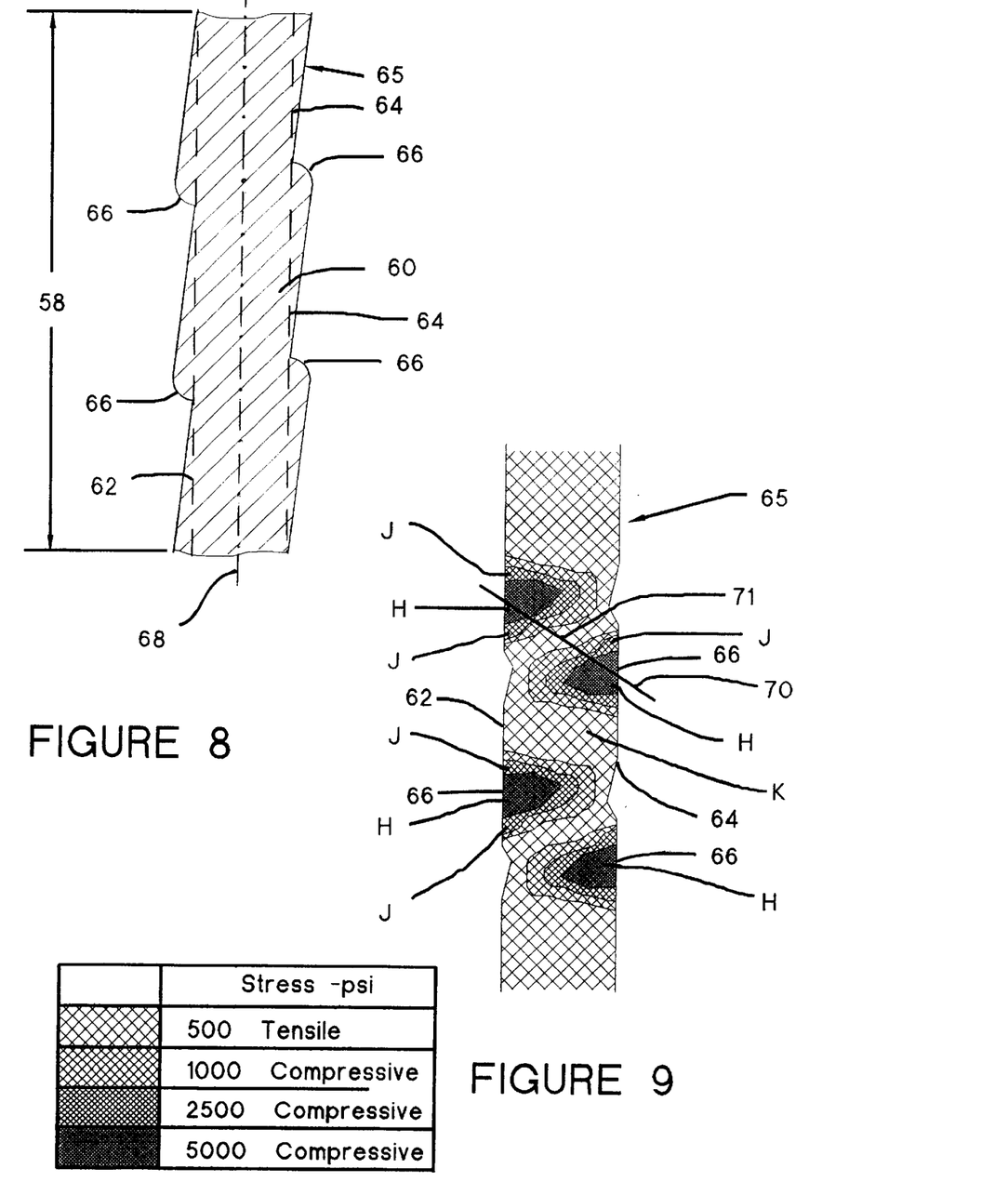
FIG. 8 is a cross-sectional view of a segment of the peripheral wall of a gasket according to one embodiment of the subject invention without a compressive stress load.
FIG. 9 is a cross sectional view of the segment of the gasket of FIG. 8 with a compressive load.

FIG. 8 shows a segment 58 of a wall 60 of a gasket 65 without any applied load or compressive force. Both surfaces 62 and 64 are shown with projections 66, defined as projected areas above the surfaces 62 and 64. In this embodiment both sides of the upstanding wall have a stepped configuration, with the steps on surfaces 62 and 64 facing in opposite directions, such that surfaces 62 and 64, including their projections 66, are not mirror images of one another with respect to longitudinal axis 68. The sloping portions of projections 66 on surface 62 may be essentially parallel to the sloping portions of projections 66 on surface 64, thereby maintaining a relatively uniform total cross-sectional thickness as measured perpendicular to longitudinal axis 68, except in the vicinity of the greatest degree of projection of projections 66 from surfaces 62 and 64. This design facilitates removal of the gasket from the mold during gasket manufacture.

FIG. 9 shows gasket 65 of FIG. 8 with a compressive stress and a tensile stress along the segment 58 (FIG. 8) of gasket 65. At the central area of the fully compressed projections 66, compressive stresses of 5,000 psi (352 kg/cm$^2$) are shown as areas H surrounded by areas J having compressive stresses of 2500 psi (176 kg/cm$^2$). The compressive stress areas H are not horizontally aligned on surfaces 62 and 64. As compressive force is applied to the gasket wall, stress areas H begin to form adjacent to projections 66, and adjacent stress areas H on opposite sides of the gasket pivot clockwise about centerpoint 71 of line 70 as application of the compressive force continues. After removal of the compressive force, adjacent stress areas H on opposite sides of the gasket 65 will tend to pivot counterclockwise about the centerpoint 71 of line 70 to compensate for relaxation (spring-back) of the can. Disposed between areas H are areas K, which have tensile stresses of 500 psi. As shown in FIG. 9, effective seal bands are provided at high compressive stress areas of gasket 65. As evident from FIG. 9, the multiple band seal design of this novel gasket provides a more effective seal than the seal of a conventional gasket. The gasket 65 can be made with a thinner cross-sectional area so that the internal volume for the conventional type housing for a fixed size cell can be increased to accommodate more active material for the cell.

FIGS. 10A through 14D are cross sectional views of segments of peripheral walls of conventional gaskets and gaskets of the invention generated using a finite element analysis software program. They show the compressive stress or elastic strain in the gasket walls 106 with and without compressive force applied to the surfaces of the walls. The gasket material is nylon and the gasket is axisymmetric with a nominal wall thickness of 0.010 inch (0.254 mm). The nominal diameter of the gasket at the inside surface of the peripheral wall 106 is 0.2 inch (5.08 mm). For those gaskets with projections 116 on one side only, the height 111 of each protrusion from the surface is 0.0023 inch (0.0584 mm); for those with protrusions 116 on both sides, the height 111 of each protrusion 116 from the surface is 0.0011 inch (0.0279 mm). In the model, compressive force is applied to the gasket wall by applying a uniform force against the outside surface of the gasket wall with a smooth, rigid plate 134 (simulating the peripheral can wall 34 in the cell in FIG. 3) and compressing the gasket wall against a rigid 0.2 inch (5.08 mm) diameter tube 132 (simulating the peripheral cup wall 32 in the cell in FIG. 3) positioned against the inside surface of the gasket wall 106. In the fully compressed condition the distance between the tube 132 inside the gasket wall 106 and the movable rigid plate 134 on the outside of the gasket wall 106 is 0.0097 inch (0.246 mm). After fully compressing the gasket wall 106, the distance between tube 132 and plate 134 is increased to 0.0101 inch (0.257 mm).

Figure 10A:
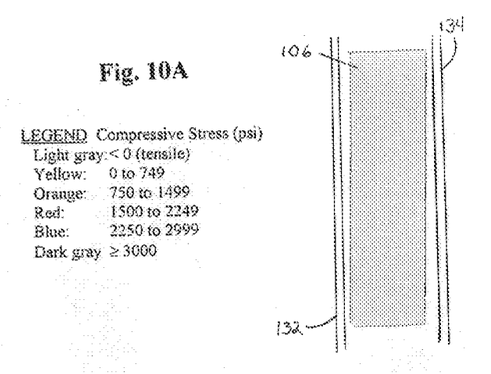
FIG. 10A is a cross sectional view showing the compressive stresses in a segment of the peripheral wall of a conventional gasket with no projections on either surface and with no compressive force applied to the surfaces.
Figure 10B:
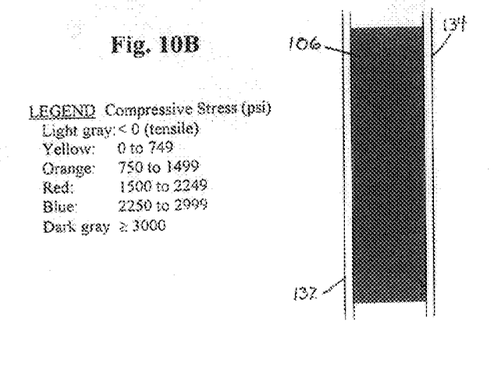
FIG. 10B is a cross sectional view showing the compressive stresses in the segment of the gasket of FIG. 10A with compressive force applied to the surfaces.
Figure 10C:
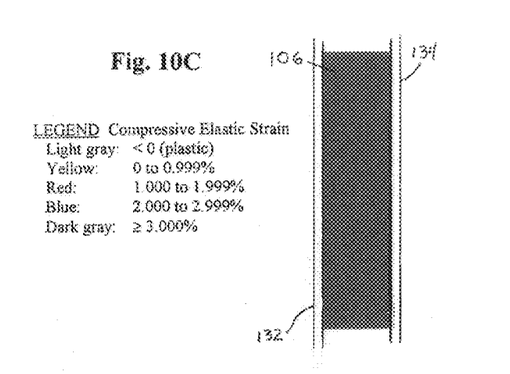
FIG. 10C is a cross sectional view showing the elastic strains in the segment of the gasket of FIG. 10B.
Figure 10D:
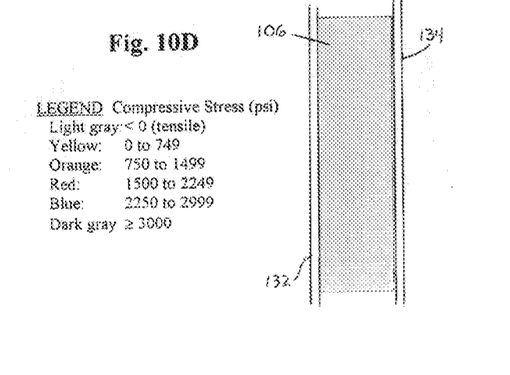
FIG. 10D is a cross sectional view showing the compressive stresses in the segment of the gasket of FIG. 10B after distance between the sealing surfaces of the cell container is increased.

FIGS. 10A through 10D show a conventional gasket, with no projections on either sealing surface. FIG. 10A there is no compressive force applied to the gasket. Consequently, there is no compressive stress in the gasket wall. In FIGS. 10B and 10C the gasket wall is fully compressed. The compressive stress is shown in FIG. 10B, and the compressive elastic strain is shown in FIG. 10C. FIG. 10D shows the compressive stress after the gasket relaxes to the partially compressed condition. When the gasket wall is in the fully compressed condition, the compressive stress throughout the gasket wall is at least 2250 psi, which is sufficient for an adequate seal in a miniature air cell. The compressive elastic strain is between 1.000 and 1.999 percent when fully compressed. When rigid plate 134 is moved to increase the distance between it and tube 132 to 0.0101 inch (0.257 mm), the compressive force is reduced, resulting in compressive stresses of less than 750 psi.

FIGS. 11A through 11D, 12A through 12D, 13A through 13D and 14A through 14D are similar to FIGS. 10A through 10D except for the presence and location of projections 116. A conventional gasket with projections 116 on only one side of gasket wall 106 is shown in FIGS. 11A through 11D, and a conventional gasket with horizontally aligned projections 116 on both sides of gasket wall 106 is shown in FIGS. 12A through 12D. Two embodiments of the gasket of the invention, with offset projections 116 on both sides of gasket wall 106, shown in the remaining drawings.

Figure 11A:
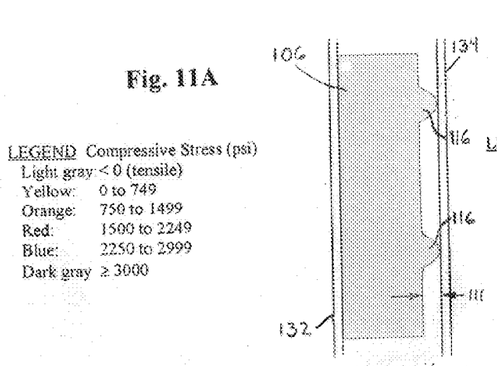
FIG. 11A is a cross sectional view showing the compressive stresses in a segment of the peripheral wall of a conventional gasket with projections on one surface only and with no compressive force applied to the surfaces.
Figure 11B:
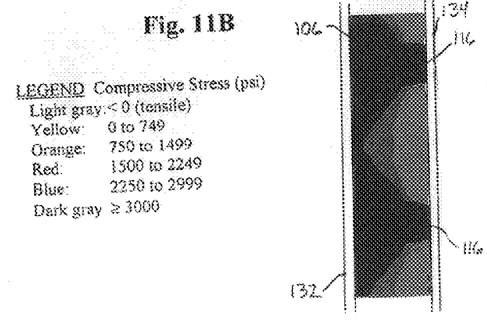
FIG. 11B is a cross sectional view showing the compressive stresses in a segment of the gasket of FIG. 11A with compressive force applied to the surfaces.
Figure 11C:
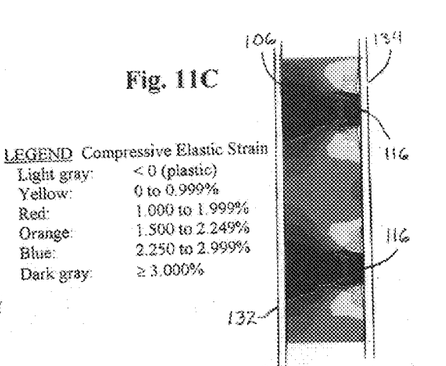
FIG. 11C is a cross sectional view showing the elastic strains in the segment of the gasket of FIG. 11B.
Figure 11D:
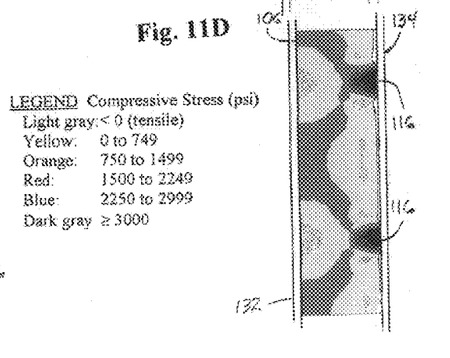
FIG. 11D is a cross sectional view showing the compressive stresses in the segment of the gasket of FIG. 11B after the distance between the sealing surfaces of the cell container is increased.

A comparison of FIGS. 10A through 10D with FIGS. 11A through 11D shows the benefits of projections 116 on one side of gasket wall 106. Areas of higher compressive stress are present at the compressed projections 106 (FIG. 11A), resulting in a better seal when the gasket wall 106 is fully compressed. There are also areas of higher compressive elastic strain at the compressed projections 116 (FIG. 11C), indicating better capability of maintaining compressive stress as the distance between plate 134 and tube 132 increases. The actual result of increasing the distance between plate 134 and tube 132 is shown in FIG. 11D. Areas of compressive stress greater than 1500 psi are maintained at compressed rejections 116, but the compressive stress is less than 1500 psi on the side of gasket wall 106 having no projections and throughout wall 106 of the gasket having no projections (FIG. 10D).

Figure 12A:
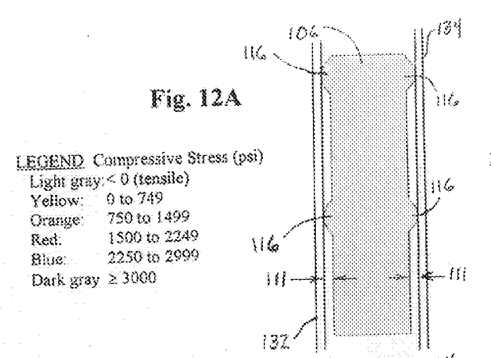
FIG. 12A is a cross sectional view showing the compressive stresses in a segment of the peripheral wall of a conventional gasket with projections on both surfaces and with no compressive force applied to the surfaces.
Figure 12B:
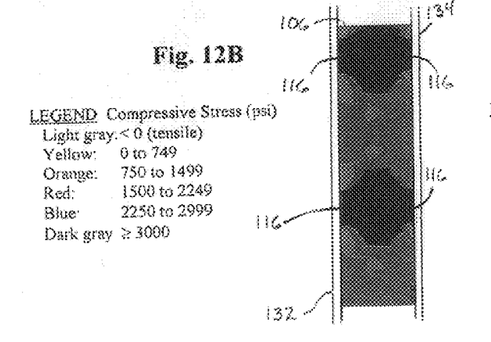
FIG. 12B is a cross sectional view showing the compressive stresses in the segment of the gasket of FIG. 12A with compressive force applied to the surfaces.
Figure 12C:
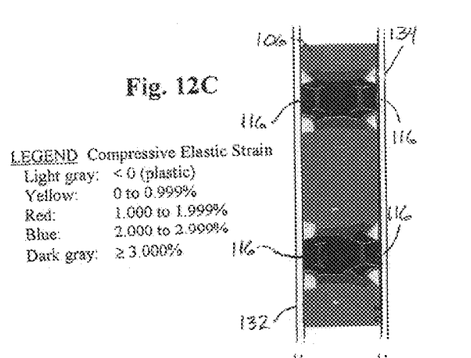
FIG. 12C is a cross sectional view showing the elastic strains in the segment of the gasket of FIG. 12B.
Figure 12D:
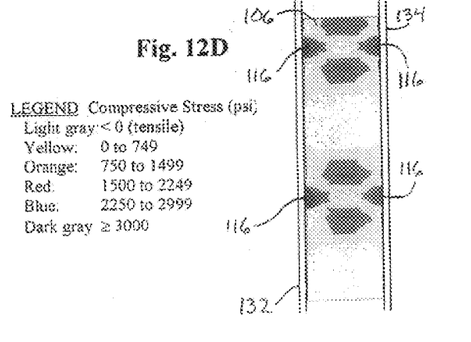
FIG. 12D is a cross sectional view showing the compressive stresses in the segment of the gasket of FIG. 12B after the distance between the sealing surfaces of the cell container is increased.
Figure 13A:
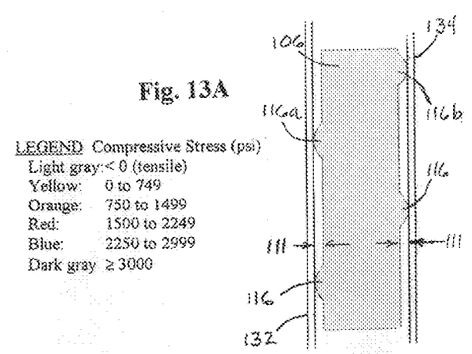
FIG. 13A is a cross sectional view showing the compressive stresses in a segment of the peripheral wall of a gasket of one embodiment of the present invention with offset projections on both surfaces and with no compressive force applied to the surfaces.
Figure 13B:
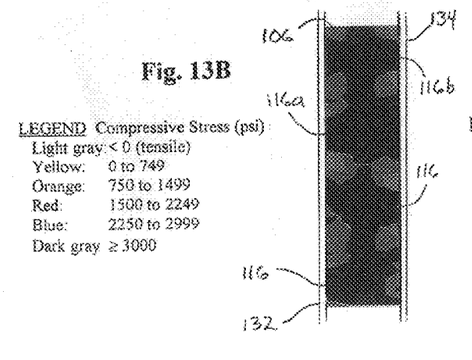
FIG. 13B is a cross sectional view showing the compressive stresses in the segment of the gasket of FIG. 13A with compressive force applied to the surfaces.
Figure 13C:
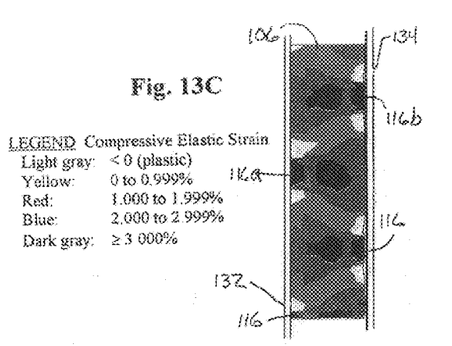
FIG. 13C is a cross sectional view showing the elastic strains in the segment of the gasket of FIG. 13B.
Figure 13D:
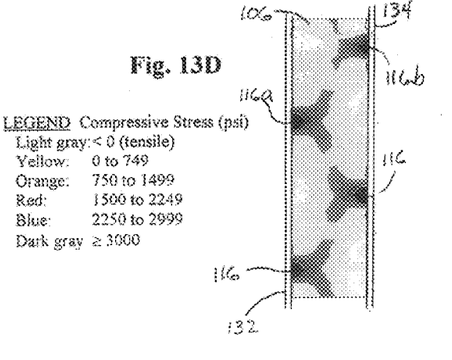
FIG. 13D is a cross sectional view showing the compressive stresses in the segment of the gasket of FIG. 13B after the distance between the sealing surfaces of the cell container is increased.
Figure 14A:
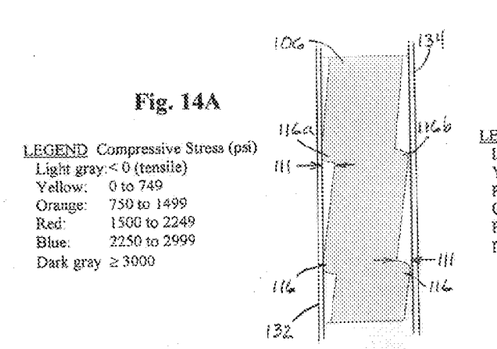
FIG. 14A is a cross sectional view showing the compressive stresses in a segment of the peripheral wall of a gasket of another embodiment of the present invention with offset projections on both surfaces and with no compressive force applied to the surfaces.
Figure 14B:
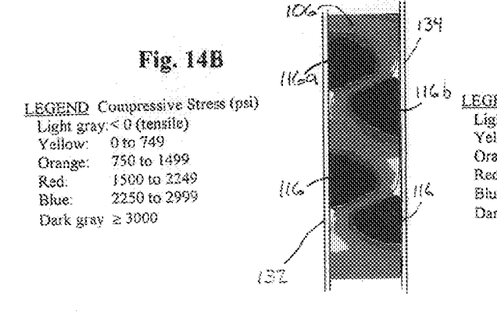
FIG. 14B is a cross sectional view showing the compressive stresses in the segment of the gasket of FIG. 14A with compressive force applied to the surfaces.
Figure 14C:
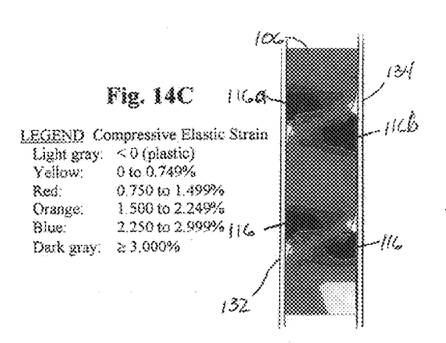
FIG. 14C is a cross sectional view showing the elastic strains in the segment of the gasket of FIG. 14B.
Figure 14D:
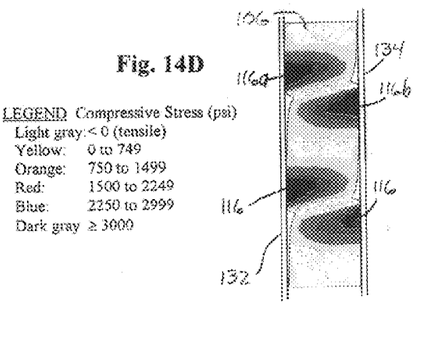
FIG. 14D is a cross sectional view showing the compressive stresses in the segment of the gasket of FIG. 14B after the distance between the sealing surfaces of the cell container is increased.

A similar comparison of FIGS. 12A through 12D shows even higher levels of compressive stress with projections 116 on both sides of gasket wall 106 shows no areas of less than 1500 psi of compressive stress on either side of gasket wall 106 when under full compression (FIG. 12B). Areas of compressive stress in excess of 1500 psi remain at compressed projections 116 after increasing the distance between plate 134 and tube 132 (FIG. 12D).

FIGS. 13A through 13D and 14A through 14D show the compressive stresses and compressive elastic strains of the gaskets of the invention under the same conditions as in FIGS. 10A through 12D. When projections 116 are located on both sides of gasket wall 106, with projections 116a on one side offset from projections 116b on the other side, rather than projections 116a on one side being aligned with projections 116b on the other side, excellent compressive stress levels are present on both sides of wall 106 under full compression. The gasket of the present invention, with projections 116 on opposite sides of gasket wall 106 offset from one another, maintains compressive stress better than conventional gaskets—surprisingly, even better than those with projections 116 on both sides of wall 106 but having projections 116a on one side aligned with projections 116b on the other side.

Figure 15:
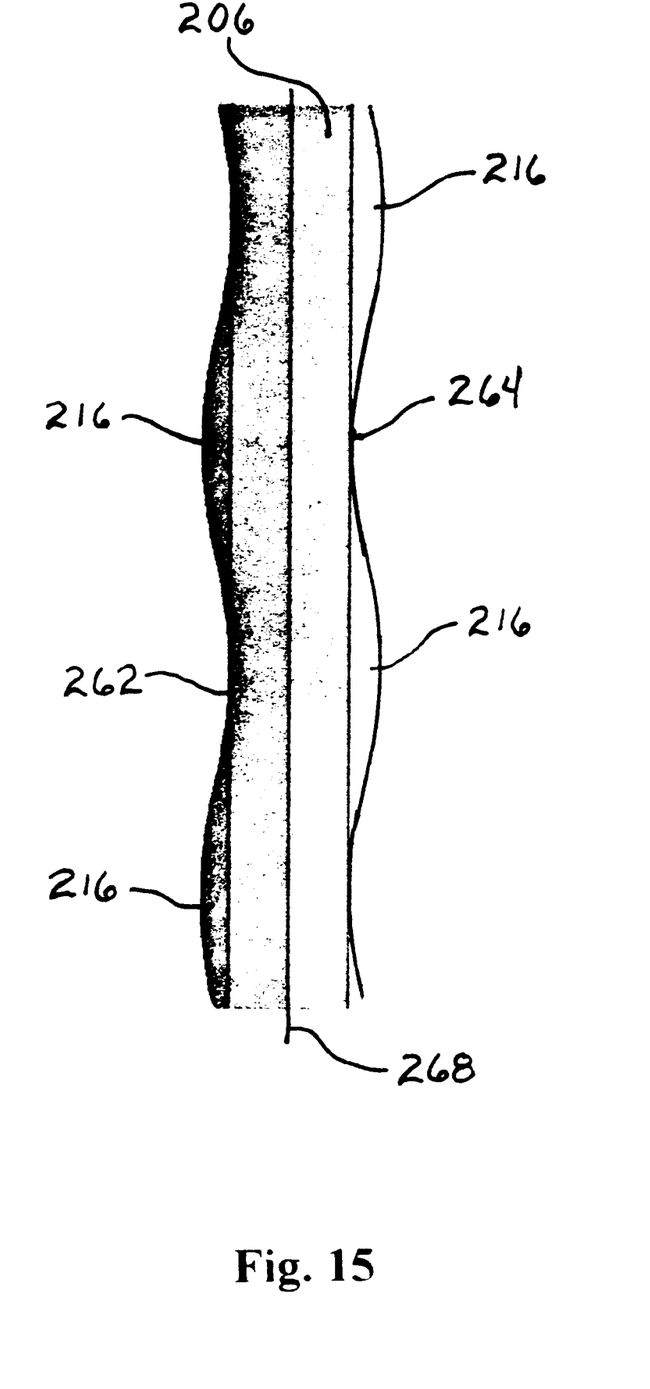
FIG. 15 is a cross sectional view of a segment of the peripheral wall of another embodiment of the gasket of the invention having projections on both surfaces and with no compressive force applied.

FIG. 15 shows another embodiment of the gasket of the present invention. A segment of the peripheral gasket wall 206 is shown with projections 216 protruding from both sealing surfaces 262 and 264. Projections 216 from surface 262 are offset from projections 216 from surface 264 in a direction parallel to the longitudinal axis 268 of the peripheral gasket wall 206.

In an alternative embodiment to the miniature cell illustrated in FIG. 3, the invention may also be adapted to a miniature cell with a cup whose peripheral wall comprises a flange that is more horizontal than vertical. The peripheral walls of both the gasket and the can are bent around the cup flange to create an axial seal, with the flange of the cup sandwiched between layers of gasket and can both above and below the cup flange. The peripheral wall of the gasket may have offset projections in the segment below the cup flange, in the segment above the cup flange or, preferably, in both the segment above and the segment below the cup flange.

The drawings, descriptions and examples disclosed herein are specifically directed to a miniature zinc/air electrochemical cell (air depolarized cell) as one preferred embodiment. It is to be understood, however, that the present invention is broadly applicable to other cell chemistries, such as mercury, silver, manganese dioxide and lithium cells, as well as to other cell sizes in which an insulating gasket is used as a sealing means.

What is claimed:

1. An electrochemical cell comprising:
   a) a first electrode;
   b) a second electrode;
   c) a separator between the first and second electrodes;
   d) an electrolyte;
   e) a two-part conductive housing, the first part being a can with a peripheral wall having a first sealing surface and the second part being a cup with a peripheral wall having a second sealing surface, wherein the first and second surfaces are substantially smooth; and
   f) an insulating gasket comprising a peripheral wall having third and fourth sealing surfaces, wherein:
      (i) the peripheral gasket wall is disposed between the peripheral can and cup walls and forms compressive seals between the first surface of the can and the third surface of the gasket and between the second surface of the cup and the fourth surface of the gasket;
      (ii) each of the third and fourth surfaces has at least one compressed projection thereon and the at least one compressed projection on the third surface is offset from the at least one compressed projection on the fourth surface in a direction parallel to a longitudinal axis of the peripheral gasket wall; and
      (iii) an area of high compressive stress relative to the surrounding area is disposed at each compressed projection.

2. The electrochemical cell according to claim 1, wherein the insulating gasket further comprises a base member, from which the peripheral wall and an inner wall spaced apart from the peripheral wall extend upwardly, thereby defining a U-shaped groove, and the base member has a bottom surface with at least one projection thereon.

3. The electrochemical cell according to claim 2, wherein the bottom surface of the base member has a plurality of projections thereon.

4. The electrochemical cell according to claim 3, wherein at least one of the projections on the gasket base is at least partially compressed, with an area of high compressive stress relative to the surrounding area disposed adjacent the compressed projection.

5. The electrochemical cell according to claim 2, wherein the cell is a miniature cell.

6. The electrochemical cell according to claim 5, wherein the cell is a miniature air cell and the compressed projection on the bottom surface of the gasket base member is in contact with a surface of one of the electrodes.

7. The electrochemical cell according to claim 1, wherein the peripheral wall of the cup comprises a flange having a substantially smooth fifth sealing surface on the side of the wall opposite the second surface of the peripheral cup wall, the peripheral walls of the gasket and the can are bent around the peripheral wall of the cup, and the fourth gasket surface forms a compression seal with both the second and fifth cup surfaces.

8. The electrochemical cell according to claim 7, wherein at least one compressed projection on each of the third and fourth gasket surfaces is disposed between the first can surface and the second cup surface, at least one compressed projection is disposed between the first can surface and the fifth cup surface, and the compressed projections on the third gasket surface are offset from the compressed projections on the fourth gasket surface in a direction parallel to a longitudinal axis of the peripheral gasket wall.

9. The electrochemical cell according to claim 1, wherein each of the areas of high compressive stress has a compressive stress of at least 1,500 pounds per square inch.

10. The electrochemical cell according to claim 9, wherein each of the areas of high compressive stress has a compressive stress of at least 2,500 pounds per square inch.

11. The electrochemical cell according to claim 10, wherein each of the areas of high compressive stress has a compressive stress of at least 3,000 pounds per square inch.

12. The electrochemical cell according to claim 1, wherein all compressed projections on the third surface are offset from all compressed projections on the fourth surface in directions parallel to a longitudinal axis of the peripheral gasket wall.

13. The electrochemical cell according to claim 1, wherein the nominal thickness of the peripheral wall of the gasket is less than 0.005 inch.

14. The electrochemical cell according to claim 13, wherein the nominal thickness of the peripheral wall of the gasket is less than 0.004 inch.

15. The electrochemical cell according to claim 1, wherein the peripheral wall of the gasket is tapered.

16. The electrochemical cell according to claim 1, wherein the projection heights are at least 5% the nominal thickness of the peripheral wall of the gasket.

17. The electrochemical cell according to claim 1, wherein the projection heights are at least 10% the nominal thickness of the peripheral wall of the gasket.

18. The electrochemical cell according to claim 1, wherein the gasket is made of a material selected from the group consisting of nylon, polytetrafluoroethylene, fluorinated ethylene-propylene, chlorotrifluoroethylene, perfluoro-alkoxy polymer, polyvinyls, polyethylene, polypropylene and polystyrene.

19. The electrochemical cell according to claim 1, wherein a sealant is disposed in at least one interface between the sealing surfaces.

20. An electrochemical cell comprising a two-part conductive housing, the first part being a can with a peripheral wall having a first sealing surface and the second part being a cup with a peripheral wall having a second sealing surface, and an insulating gasket, the gasket comprising a peripheral wall having third and fourth sealing surfaces disposed and compressed between the peripheral can and cup walls; wherein, with the gasket in the normal uncompressed condition:
   (a) each of the third and fourth surfaces has at least one projection thereon;
   (b) each projection has a center of mass, a point of greatest protrusion relative to the longitudinal centerline and a point of least protrusion relative to the longitudinal centerline;
   (c) the center of mass of each projection on the third surface is offset from the center of mass of each projection on the fourth surface in a direction parallel to the longitudinal centerline;

(d) each projection comprises a step having a flat segment, sloping from its point of highest protrusion to its point of lowest protrusion; and (e) the flat segments of the projections on the third surface are parallel to the flat segments of the projections on the fourth sealing surface.

21. A process for assembling an electrochemical cell comprising the steps:

a) preparing a conductive can having a peripheral wall with a first sealing surface;

b) preparing a conductive cup having a peripheral wall with a second sealing surface;

c) preparing an electrically insulating gasket having a peripheral wall with third and fourth sealing surfaces, each having at least one projection thereon, wherein the at least one compressed projection on the third surface is offset from the at least one compressed projection on the fourth surface in a direction parallel to a longitudinal axis of the peripheral gasket wall;

d) placing electrode materials, separator and electrolyte within the cup and the can;

e) assembling the can and the cup together so that the sealing surfaces of the peripheral wall of the gasket are in contact with and disposed between the peripheral walls of the can and the cup; and f) securing the can to the cup so as to compress the at least one projection on both the third and fourth surfaces of the peripheral wall of the gasket, creating an area of high compressive stress at each compressed projection, thereby effectively sealing the can to the cup via the gasket and electrically insulating the can from the cup.

22. The method according to claim 21, wherein each projection comprises a center of mass, a point of greatest protrusion relative to the longitudinal centerline of the gasket wall, a point of least protrusion relative to the longitudinal centerline of the gasket wall, and a step having a flat segment sloping from its point of highest protrusion to its point of lowest protrusion; wherein the center of mass of each projection on the third surface is offset from the center of mass of each projection on the fourth surface in a direction parallel to the longitudinal centerline, and the flat segments of the projections on the third surface are parallel to the flat segments of the projections on the fourth surface.

23. The method according to claim 21, wherein a sealant is applied to at least one of the sealing surfaces.

\* \* \* \* \*